United States Patent [19]
Green et al.

[11] 4,403,256
[45] Sep. 6, 1983

[54] TELEVISION PICTURE STABILIZING SYSTEM

[75] Inventors: Richard R. Green, Hamden; Henry W. Mahler, Newtown; John E. Siau, Darien, all of Conn.

[73] Assignee: CBS Inc., New York, N.Y.

[21] Appl. No.: 319,845

[22] Filed: Nov. 10, 1981

[51] Int. Cl.³ .............................................. H04N 5/21
[52] U.S. Cl. ..................................... 358/222; 358/126
[58] Field of Search ................ 358/109, 222, 125, 105, 358/126

[56] References Cited

U.S. PATENT DOCUMENTS 3,711,639 1/1973 Alpers .................................. 358/126
3,859,460 1/1975 Westell ................................ 358/222

*Primary Examiner*—Joseph A. Orsino, Jr.
*Attorney, Agent, or Firm*—Spencer E. Olson

[57] ABSTRACT

The disclosed picture stabilizing system detects and measures picture unsteadiness in recorded or live video caused by an unsteady television camera and automatically eliminates the unsteadiness without destroying intentional panning and tilting of the camera. This is accomplished by selecting camera motion references within the camera field of view consisting of one horizontal edge and one vertical edge of an object which will normally be stationary, such as a door, a window, or a piece of furniture. The stabilizer "locks" onto these edges, continually measuring their motion from field to field and utilizing a frame store, makes the necessary vertical and horizontal corrections to the overall picture to eliminate such motion. The system is able to correct for movement due to random unsteadiness without interfering with planned camera movement.

28 Claims, 7 Drawing Figures

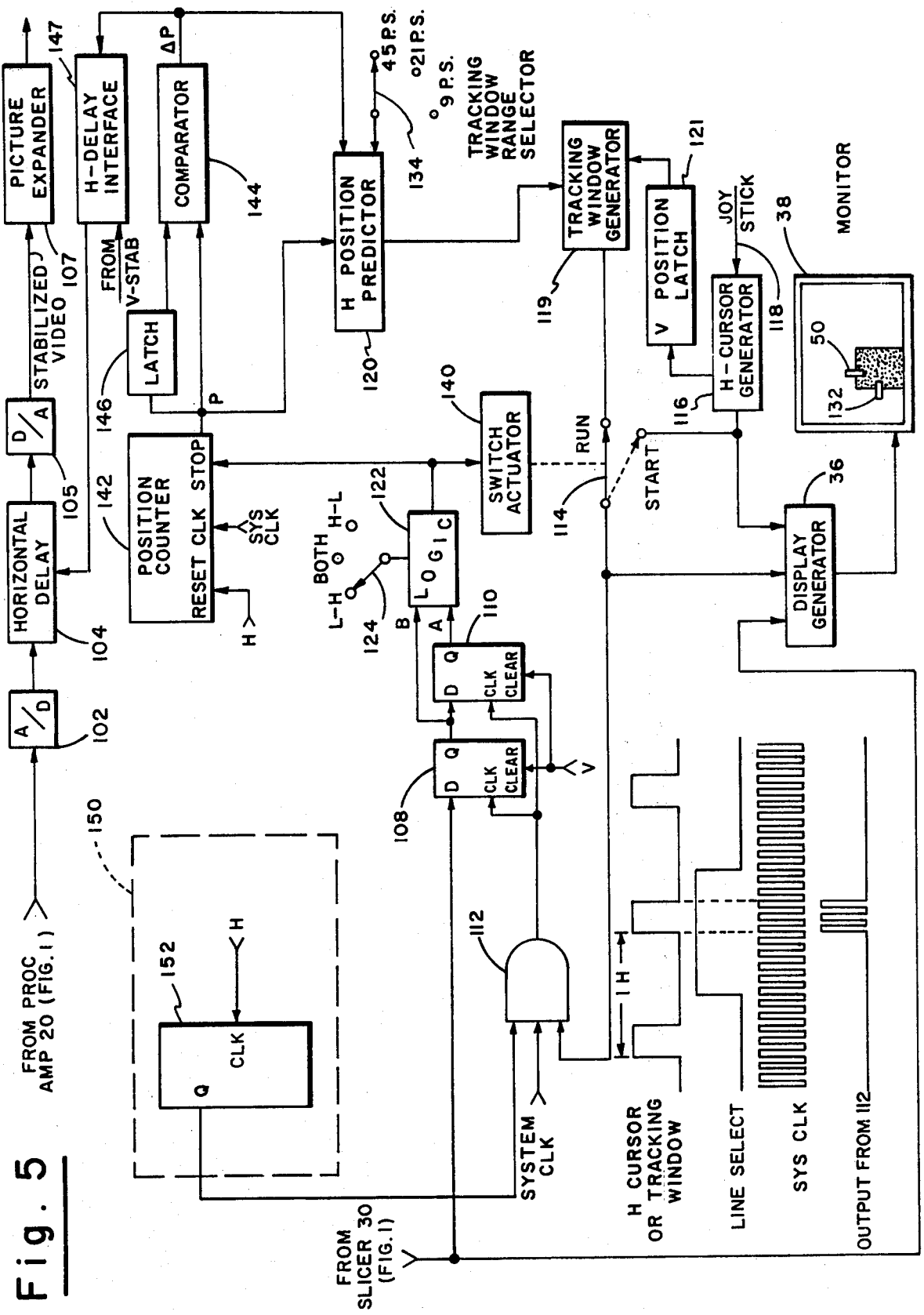

TELEVISION PICTURE STABILIZING SYSTEM

BACKGROUND OF THE INVENTION

This invention generally relates to video signal processing apparatus, and more particularly to a signal processing system for stabilizing a television picture reproduced from video produced by a camera subjected to motion.

In the electronic news gathering (ENG) application of television, in which a portable camera and recorder are taken into the field, often the cameraman is subjected to pushing and jostling with the consequence that the picture reproduced from the recorded video output of the camera exhibits an annoying jumpiness which seriously detracts from the viewability of the picture. That is, even objects in the recorded scene normally expected to remain stationary, such as buildings, trees, and the like, move up and down in a jittery fashion as a result of sudden motion of the camera. The effect is particularly annoying when program segments shot with a remote minicam subjected to jostling are interspersed with truly stationary segments shot with a stable camera. The viewability of the reproduced picture can be similarly impaired when a camera equipped with a telephoto lens, even if stably held, is used to record a distant scene, such as a person standing on a platform delivering a speech, since even very slight movement of the outer end of the lens, usually up and down, is magnified and causes the image of the speaker to move up and down in the reproduced picture. Undesirable jitter in the television picture can also occur when the video signal is produced by a camera carried on moving platform, such as a helicopter, particularly when a telephoto lens is used because, again, vibration of the lens is magnified and causes a "jumpy" picture.

Devices are commercially available for stabilizing the image of a video signal produced by a camera carried on an unstable, usually moving platform, which have been used with success in the shooting of television pictures on aircraft, both fixed wing and helicopters. One such device, which operates on opto-mechanical principles, is the image stabilizer distributed by the Arriflex Corporation, Blauvelt, N.Y., which includes a support plate on which the camera is mounted and a stabilizer positioned in front of the camera lens. Entering light rays are reflected off a front-surface mirror mounted on two gimbals powered by a battery-driven gyroscope, and the image from this mirror is reflected onto another fixed mirror and into the camera lens. The directional stability of the gyroscope resists off-axis movement—such as panning of the camera—and a precession brake causes the gyro to lean steadily with the panning motion, thereby to stabilize the image. This type of stabilizer is a real-time device in the sense that it can be used only during actual shooting of the picture. It is not readily adaptable for use with portable television cameras, and even if it could be so adapted the added weight would be inconsistent with the emphasis, particularly for ENG applications, toward smaller and lighter weight cameras. It not being conveniently possible to effect image stabilization during shooting of a scene with a portable camera, if there is to be correction for the jumpiness of the reproduced image caused by jostling or other motion of the camera, it must be later applied to the recorded camera signal, before editing and/or reproduction for broadcasting or viewing.

The described jumpiness in the television picture due to erratic camera motion is different from and is not to be confused with the picture jitter sometimes caused by time base errors introduced during reproduction of video signals recorded on magnetic tape, for example, by reason of expansion or contraction of the tape during or after recording, variations between the tape recording speed and the tape reproducing speed, and the like. The source and consequence of such time base errors will be appreciated from a brief description of the NTSC television system which uses an interlaced scanning system consisting of repeating frames having a first, or odd, field which reproduces alternate lines of each frame and a second, or even, field interlaced with the first field which reproduces the remaining lines of each frame. The odd field consists of parallel lines, the first of which begins at the upper left corner of the television screen and the last of which ends in the middle of the bottom of the screen. The even field consists of parallel lines interlaced between the lines of the odd field, the first of which begins in the middle of the top of the television screen and the last of which ends at the lower right corner of the television screen. The video at a point in a line from an even field, for example, contains video data which reproduces a part of the picture occurring just above or just below a corresponding point on the next adjacent line from the odd field. The vertical distance between such corresponding points is one-half pitch, or one-half the center-to-center distance between adjacent field lines. During the scanning process for each frame, it is important that each succeeding line start and stop at the same horizontal position as the line preceding it so that the vertical edges of the generally rectangular picture are straight and so that the reproduced picture is a true image of the scene being televised. To synchronize the scan of the cathode ray tube with the transmitted video signal a horizontal synchronizing pulse is provided at the beginning of each line, and a vertical synchronizing pulse is provided at the beginning of each field.

Apparatus has long been known for removing time base errors from video signals. Early forms of time base error correctors, suitable for use with video tape recorders having four rotary heads and typically have time base errors of one microsecond or less, employed tapped delay lines, or other forms of delay elements, for variably delaying the incoming video signals in order to compensate for time base errors. Time base correctors in current use typically employ digital techniques to accommodate and correct time base errors of several television lines, as are frequently encountered in currently used popularly priced helical scan video tape recorders. Whatever the type or implementation, all time base corrects operate on the general principle of examining the horizontal sync pulse of the reproduced video signal and comparing it with a stable local reference and then advancing or retarding the reproduced signal so that its horizontal sync pulses are always in synchronism with the local reference. Thus, in a time base corrected video signal, any object within the scene represented by the signal bears a fixed time relationship to the horizontal sync pulse of the television line or lines in which the object appears.

In a video signal produced by a television camera subjected to erratic motion during shooting of the picture the situation is quite different; in this case even though the horizontal sync pulses generated at the beginning of each line are absolutely stable, objects in the scene that are expected to be stationary move around in jumpy fashion, producing an effect just as annoying, or perhaps more so, as picture motion caused by sync instability. In other words, here the horizontal sync is perfectly stable, and the jumpy motion in the reproduced picture is caused solely by camera motion.

OBJECTS AND SUMMARY OF THE INVENTION

The primary object of the present invention, therefore, is to provide a signal processing system capable of detecting and measuring picture unsteadiness in recorded or live video, and of automatically eliminating such unsteadiness without destroying intentional panning and tilting of the camera.

According to the present invention, a video signal from an unsteadily held camera is passed through a variable delay device having a controllable delay time which enables introduction of an off-setting delay equivalent in time but in a direction opposite to the motion that would otherwise be observed in the television picture as a consequence of camera motion. Since in the scanning system described above (as well as in other interlaced scanning systems) a time delay is directly related to picture position, the amount of unwanted picture motion is determined and the variable delay device is controlled to introduce an equivalent delay to offset the motion; in order to correct for motion that has, in effect, already taken place, the uncorrected signal is delayed to permit correction to be made to the field in which the unwanted motion was first noted and measured.

More specifically, as used in the NTSC system of television, correction is made at the field rate and is achieved by first deriving from the uncorrected video signal horizontal and vertical reference signals representative of normally stationary vertically and horizontally disposed edges, respectively, in the scene represented by the video signal; for example, the upper edge of the frame of a dark door in a light colored wall would provide an effective vertical reference signal and one side edge of the door might serve as a horizontal reference. To effect vertical stabilization of the picture, the position of the vertical reference signal in the current television field (which, for example, may be odd) is repetitively compared with the position thereof in the next previous odd field, and for each comparison an error signal is produced which represents the integral number of television lines of position change, if any. The error signal, which may have positive or negative sense, is used to advance or retard the delay of the delay circuit by an amount to cause the vertical reference line to have the same vertical position in successive frames or successive odd fields. In analogous fashion, the horizontal position of the vertically disposed reference line is determined (as by counting system clock pulses starting from H sync and stopping with the reference edge), its position in the current field (which, again, by way of example may be odd) is repetitively compared with its position in the next previous field (even, in this example) to produce an error signal indicative of the amount of charge, if any, and horizontal correction in an amount and sense indicated by the error signal is introduced in the corresponding odd field.

The above, and other objects, features and advantages of the invention will become apparent, and its construction and operation better understood, from the following description read in conjunction with the accompanying drawings.

BRIEF DESCRIPTION OF THE DRAWINGS

FIG. 5 is a block diagram of the horizontal stabilizer portion of a video processing system according to the FIG. 1 embodiment of the invention;

DETAILED DESCRIPTION OF THE PREFERRED EMBODIMENT

Although the picture stabilizing system of the invention is useful in any of the currently used television systems, the invention will be described as applied to the NTSC color television system. Further, although the system may be implemented in either the analog or the digital domain, the digital implementation is preferred because of its superior accuracy and ease of construction and will be described.

Figure 1:
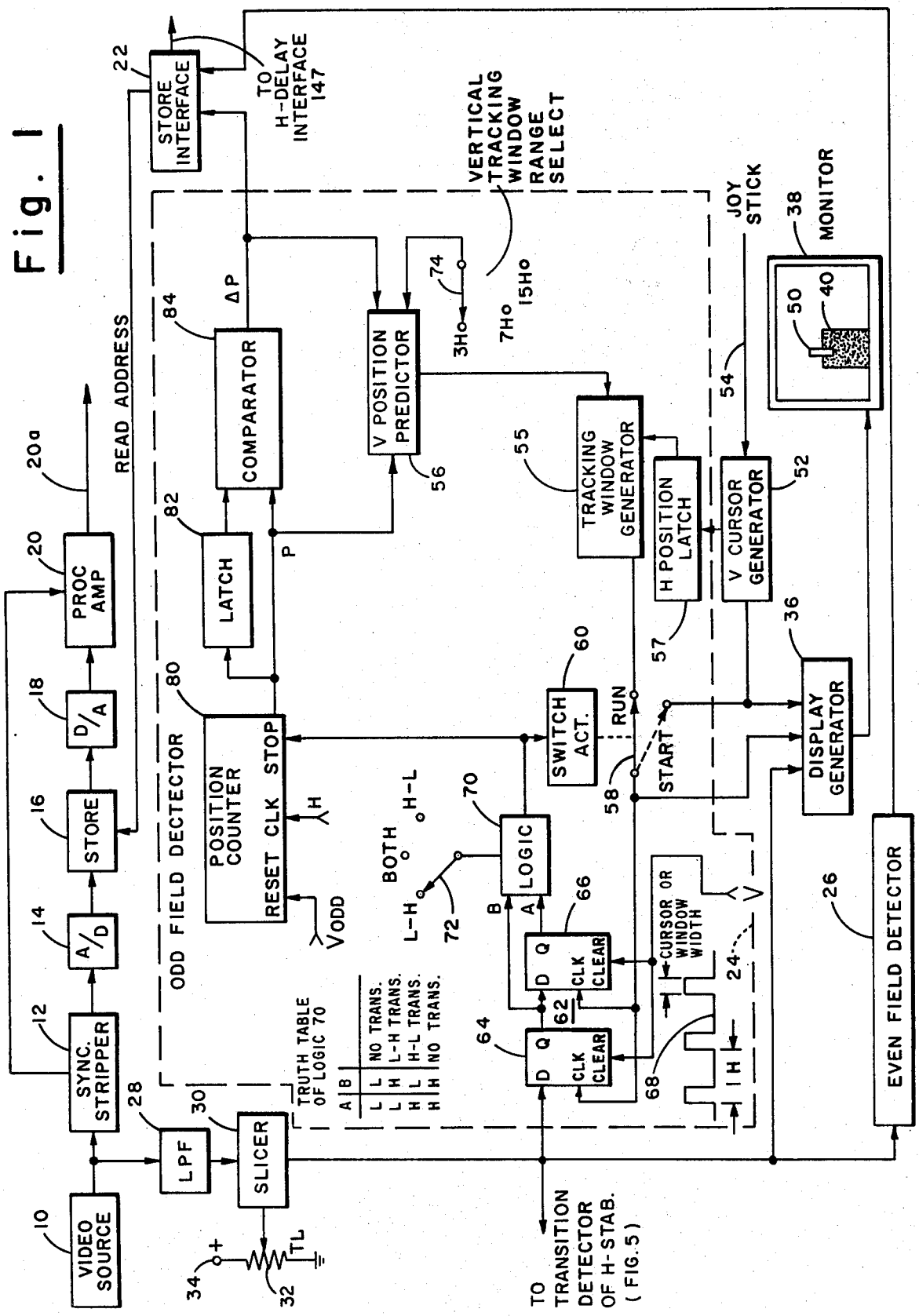
FIG. 1 is a block diagram of the vertical stabilizer portion of a video processing system according to an embodiment of the present invention.

Referring first to the vertical picture stabilizer illustrated in FIG. 1, a video input signal from a video source 10 which, for example, may be a video tape recorder for reproducing a video signal produced by an unsteadily held portable television camera, is applied to a sync stripper 12 which removes the sync pulses and the resulting non-composite video signal is encoded by a pulse code modulation (PCM) technique, such as described in U.S. Pat. No. 3,946,432 utilizing an 8-bit code, in an analog to digital converter 14 and then applied to and propagated through a digital storage or delay means 16. The delay circuit may take the form of the now well-known digital frame store and for reasons which will become apparent, preferably has a storage capacity of 525 television lines, or one NTSC frame. The digital non-composite video emerging from the frame store, normally delayed by up to 525 H, is converted to analog form by a digital to analog converter 18 and applied to a conventional processing amplifier 20 which re-inserts the sync and produces a composite video signal at its output terminal 20a. The A/D and D/A converters may be incorporated in digital frame store 16, and normally are in currently available frame stores. It is possible to control currently available frame stores so as to delay an applied video signal by an arbitrary amount from zero up to 525 H in units of system clock intervals, typically, about 70 nanoseconds. The delay time is altered by advancing or retarding the read address of the store under control of a suitable frame store interface 22, and the amount of which the uncorrected video signal must be delayed to stabilize an unsteady picture caused by camera instabilities is detected and measured by the signal processing systems now to be described.

The principles on which operation of the system is based will be best understood by initially confining the description to vertical picture stabilization (i.e., removal of up and down motion in the television picture) which, as has been noted, is accomplished by delaying or advancing the uncorrected video by an integral number of horizontal lines. To detect the presence and magnitude of vertical motion in a televised scene it is necessary to observe the location of a reference horizontal edge and compare it with its location one frame (1/30 sec.) earlier; i.e., in the next previous corresponding odd or even field. Direct comparison with the previous field cannot be made because of the interlaced nature of the NTSC (PAL and SECAM, also) system; either the odd fields, or the even fields, or both may be utilized. The invention will be described in the context of using odd fields for comparison, with the understanding that the system would have the same operation if the even fields were utilized. An alternative approach utilizing both the odd and the even fields will also be discussed.

Essential to the operation of the control system is the derivation from the incoming video signal of a reference signal representative of a normally stationary horizontal edge in the television picture, the vertical position of which will change with up and down motion of the picture and thus provide a reference for measuring the amount of correction needed to maintain the horizontal edge, and hence the picture itself, at substantially the same vertical position. The reference signal is conveniently derived from only the luminance component of the input video signal and to this end the chrominance component of the video signal is removed by a low pass filter 28, and the luminance component then applied to a video slicer 30, which is also supplied with an adjustable threshold slice level TL by a potentiometer 32 connected between a source of positive potential, represented by terminal 34, and ground. The slicer circuit, which may take any of many forms known to the art, delivers a binary output which is high when the video signal exceeds the threshold level. The threshold level is selected so that an abrupt change in the video, say from black to white, or from white to black, as might be encountered at an edge exhibiting a contrast with the background, is highly intensified by producing a 2-level signal at the output: if the amplitude of the video happens to be below the threshold level the output voltage will have one level, and if the video exceeds the threshold the output signal will have the other voltage level. When the sliced video, after reinsertion by a suitable display generator 36 of the sync and burst removed by the slicer, is displayed on a picture monitor 38, the result is a black and white signal display with no grey; all luminance below a certain threshold level is black, and all luminance above the threshold is white, or vice versa, depending on the polarity of the slicer output signals and whether or not they are inverted before being applied to the monitor.

Although the entire video signal is sliced, operation of the system depends only on such object or objects in the scene which will serve as a suitable reference, which for vertical stabilization would be a horizontal line or edge of an object that would normally be stationary. In the example illustrated in FIG. 3, the top edge 40 of a dark door 42 against a bright wall 44 would provide an excellent reference for measurement of up and down motion of the picture in which it is contained. The example chosen for illustration also includes a window 46 the frame of which appears black in the display and presents both horizontal and vertical edges; the lower edge 48 of the window frame could therefore be used an an alternator reference edge for measurement of up and down picture motion. As will be seen later, the operator may select either of edges 40 or 48 as the horizontal reference, the system thereafter having the ability to lock onto the selected reference and not be frustrated or confused by the other proximate horizontal edge.

The horizontal edge in the scene chosen as the reference for measuring up and down motion of the picture is electronically selected by a cursor 50 which is generated by a vertical cursor generator 52 and under control of display generator 36 is displayed on the monitor as a rectangle having greater illumination intensity, or a different color, than that of the displayed sliced video. The left hand vertical edge of cursor 50 defines a vertical line along which the detector looks for a horizontal edge, its horizontal width being unimportant other than that some finite width is required to enable the operator to see it. In the preferred embodiment, cursor 50 and another cursor for selecting a vertical edge for horizontal stabilization (to be described), are displayed in color and, therefore, must be at least several cycles of the color subcarrier in width.

The position of the cursor 50 on the display is electronically manipulated up and down and from left to right by a joy stick control of conventional design, schematically shown at 54, which produces a pair of D.C. signals, one for each of the horizontal and vertical axes, which together establish a precise coordinate position on the screen; thus, by properly manipulating joy stick 54, which is operatively associated with cursor generator 52 and display generator 36, it is possible to position the cursor at any desired location on the display. In the illustrated example, it will be assumed that the cursor has been positioned by joy stick manipulation to straddle the horizontal edge 40 so as to "look at" the point of intersection of the left hand edge of cursor 50 with the horizontal edge 40 and thus specify such point on edge 40 as the picture-contained reference for measurement of up and down picture motion.

Omitting for the present a description of the function and implementation of the illustrated position predictor 56, when a switch 58 (schematically shown as a mechanical switch but actually an electronic switch) is moved to its "START" position by a switch actuator 60 (to be described), cursor 50 is applied as one input to a transition detector 62 consisting essentially of two positive-edge-triggered "D" flip-flops 64 and 66 cascade-connected as shown. As is known, a characteristic of the "D"-type flip-flop is that there is a finite delay, following application of a clock pulse, before information present at its D input is passed to its Q output; this feature is used to advantage in the transition detector. The output of video slicer 30, which is high whenever the video exceeds the threshold level TL, is applied to the D input of the flip-flop 64, and its Q output is applied to the D input of flip-flop 66. Vertical sync pulses derived, for example, from sync stripper 12, are applied simultaneously to the "CLEAR" input of each of the flip-flops for resetting transition detector 62 at the beginning of each field of incoming video.

Figure 3:
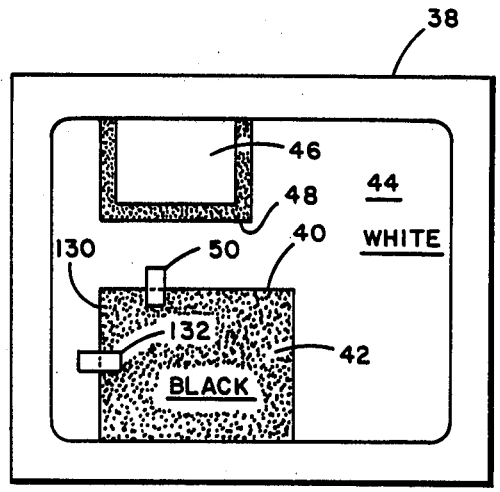
FIG. 3 is an illustration of a display on a television monitor useful in describing the operation of the system of FIG. 1.

The V-cursor is represented by a digital waveform 68 which is high whenever a portion of the video which is covered by the cursor is being scanned. This waveform is a sequence of pulses which occurs once every field and adjacent pulses of which are separated by exactly 1 H; the width of each of these pulses is equal in time to the width of the cursor 50. The number of pulses in the sequence is determined by the size of the cursor in the vertical direction; i.e., if the cursor is twenty lines high the pulse sequence 68 will be twenty pulses long. This waveform is applied to display generator and displayed as a vertically disposed rectangle on monitor 38, and is also applied to the clock input of each of flip-flops 64 and 66, each of which is operative to pass, after some delay, information present at its "D" inputs to its Q output whenver a positive-going edge occurs at its clock input, and the Q output will remain at that level (either high or low) until the next positive edge occurs at the clock input. Thus, if the first pulse in the sequence occurs at time T, then just after time T the Q output of the flip-flop 64 will equal the output of slicer 30 at time T and will be unchanged until just following time$=T+1H$, at which time flip-flop 66 looks at its "D" input; therefore, just after time$=T+1H$ the Q output of flip-flop 66 is equal to the output of slicer 30 at time$=T$. In the meantime, at time$=T+1H$ flip-flop 64 will have passed its "D" input to its Q output just after time$=T+1H$. The inherent delay of the flip-flops permits comparison of output A from flip-flop 66 with the output B from flip-flop 64 in a suitable logic circuit 70 to provide an indication of whether or not a vertical transition (i.e., from black to white, or white to black) has occurred. As seen from the truth table of logic 70, when output A of flip-flop 66 is equal to output B of flip-flop 64 (i.e., both are low, or both are high) no transition has occurred. On the other hand, it is known that a transition has occurred when outputs A and B are unequal, and the logic also determines whether the transition was from low-to-high or from high-to-low, and by means of a switch 72 the operator can select either the L-H transition or the H-L transition, or both, for sensing and measuring the position of the reference transition; e.g., the edge 40 of the door 42 (FIG. 3). Once a reference transition is found in this manner, the output of logic 70 is high and automatically activates the switch actuator 60 which in turn, throws switch 58 from its "START" to "RUN" position; when the switch is in the latter position, transition detector 62 looks for a reference transition within a region defined by a vertical tracking window produced by a tracking window generator 55 and position predictor 56, the operation of which will be described presently. Suffice it to say for now that the waveform of the vertical tracking window is identical to waveform 68 of the vertical cursor except that it has fewer pulses per field; typically, it consists of either three, seven or fifteen pulses per field, selectable by the operator by actuation of a switch 74, corresponding to a vertical tracking window height of three, seven or fifteen television lines. The significance of this selectability, and the function of the position predictor and the tracking window, will be evident from a later description thereof following discussion of how the vertical position of the reference transition in the television picture is measured.

The output signal from logic 70 is also applied to the "STOP" teriminal of a position counter 80, the function of which is to determine the vertical position of the selected reference edge. Since the position of any point in the picture is a function of time, the vertical position of the selected horizontal reference is determined by counting down from the first scan line in a field (in this case, an odd field) until the line containing the reference transition is reached. To this end, the counter is reset by odd frame sync pulses derived from the incoming video signal, for example by sync stripper 12, and applied to the "RESET" terminal of counter 80, and horizontal sync pulses H, also derived from the incoming video, are applied to the "CLOCK" input of the counter. The counter counts scan lines of the field until stopped by a signal from logic 70, signifying that the vertical position of the horizontal reference has been reached, whereupon the count stops and the counter produces at an output terminal a digital number representative of the scan line containing the reference edge.

This number, which for purposes of illustrative example will be assumed to be 125 (indicating that the reference edge is in the 125th line down from the top of the odd field), is supplied to and stored for a period of one television frame in a suitable latch circuit 82 so as to be available for comparison with the number of the line which contains the reference edge in the next-occurring odd field. The number stored in latch circuit 82 is outputted at the frame rate and applied as one input to a comparator 84, the second input of which is the output of counter 80; thus, comparator 84 compares the position of the reference edge in the current odd field (that is, the number directly applied to the comparator from counter 80) with its position in the next previous odd field, as represented by the number stored in the latch circuit. Supposing, now, that in the next previous odd field the reference edge was at line 124; the one-line difference indicates that the reference has moved downward, meaning that the camera had tilted upward, by one scan line during the frame interval. Unless the difference is corrected, the reproduced picture will move downward by one horizontal line; to prevent such motion the output of comparator 84 ($\Delta P=+1$) is applied to suitable interface circuitry 22, the function of which is to control the delay of frame store 16 by advancing or retarding the read address of the frame store. In the present example, then, the interface circuitry 22 would advance the read address of the frame store by one horizontal line so as to cause the reference edge to appear in the same scan line of the current field as it occupied in the immediately preceding odd field. Continuing with this example, and assuming that the reference horizontal edge appears at line 126 of the next succeeding odd field, indicating that in a period of a 30th of a second the reference edge has moved downward by another horizontal line, comparator 84 will again call for advancing the read address of frame store 16 by one horizontal line. In the event of continued camera motion in the same direction, the system continues to advance the read address of the frame store to "keep up" with the motion until such time as there is no change in the position of the reference edge in two successive odd fields; that is, there is no output from comparator 84, or the maximum limit of the correction range has been reached with the consequence that no further change is made to the read address of the frame store. If the count should reverse, indicating that the reference edge is moving upward instead of downward, the frame store interface 22 would retard the read address of the frame store to move the entire picture down to where it was in the immediately preceding odd field.

How and when horizontal lines are added or subtracted to effect vertical stabilization will now be described in greater detail. Let it again be assumed that the odd field detector has measured a 1H change in position in a direction requiring that the video in the frame store be advanced by the same amount. It will be appreciated, however, that if the correction were to be made as soon as the need for it is detected, the change would be annoyingly visible in the picture. To avoid this, the correction is applied during the vertical blanking period (when there is no picture) at which time the measured change in position of the reference edge is applied to the video in the frame store by changing the delay introduced by the frame store.

Although a full frame of storage preferably is provided for achieving half-line correction (to be described), one field of storage capacity in store 16 is sufficient to enable correction to be made in each odd field, in the very field where the error occurred, because it is capable of retarding all of the video for a time sufficient to determine the amount of correction required and, in effect, to apply it retroactively. Thus, if there is a shift of 1H in a given odd field, for example, by delaying the video by one field it is possible to insert the correction during the entire time that the odd field is present at the output of store 16; i.e., the entire field gets the 1H change in delay, and the correction is made synchronously by fields.

Figure 4:
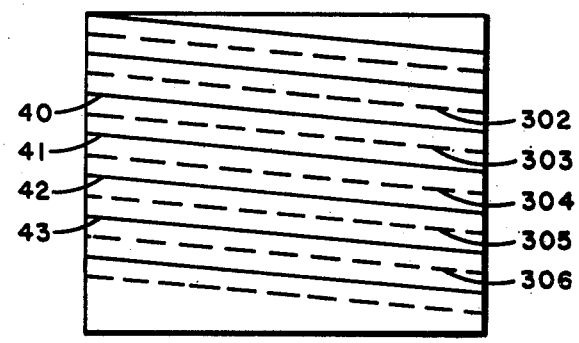
FIG. 4 is an illustration of a fragment of a television raster display useful in describing the operation of the system.

By varing the delay through store 16 by integral multiples of H to achieve vertical correction, it will be seen from consideration of the interlaced scan of FIG. 4 that a 1H delay in the store causes the picture to move 1H or two frame lines; a full frame of storage makes ½H or frameline correction possible. FIG. 4 shows several lines of a 525-line interlaced video picture as they would appear on a picture monitor; the lines from one field (e.g., odd) are shown in solid line and the lines from the other field (e.g., even) are shown by dashed lines. The addition of 1H delay will move line 40 of the odd field to the position of line 41, line 41 to that of line 42, and so on, and in the even field, line 303 will be moved to the position of line 304, line 304 to that of line 305, and so on; from this it is seen that a correction of ½H could be made by adding a delay of 263H or subtracting a delay of 262H. That is, in either case line 40 would move to the position of line 303, line 41 to that of line 304, line 42 to that of line 305, line 303 to that of line 41, line 304 to that of line 42, line 305 to that of line 43, etc. Similarly, one-half of the effect of subtracting a 1H delay in frame store 14 can be achieved by adding to it a delay of 262H or subtracting from it a delay of 263H. Making corrections in smaller steps in this manner (i.e., in one frame line instead of one field line) greatly improves the quality of the stabilized picture. This is particularly important with slowly moving vertical motion, since the time occupied by a vertical shift of 1H may be several frames, or even seconds, but the necessary 1H correction must be implemented in one quantum jump if only a single field of storage is used; this creates disturbing jumps in the picture. With a frame of storage available, frame line correction, as just explained, is implemented as follows.

With no correction being applied, the output is delayed by one frame in store 16. Upon detection of a ΔP of one line in the current odd field as compared to the immediately preceding odd field, frame store interface 22 alters the reading of store 16 during the following vertical blanking interval to advance the read address either 262 lines, if the detected change was upward, or 263 lines if the change was downward. In this way, the field which indicated the error is effectively shifted by ½H, or one frame line, in the desired direction. If no further ΔP's are detected for several frames, the additional ½H of correction is implemented after a period of time such that the final 1H of correction is not disturbing to the viewer. While experience has shown seven frames to be a preferred interval, provision is made for a range of 3 to 15 frames. Assuming a 7-frames delay, seven frames after the advance in the read address of store 16 by 262 or 263 lines, the read address would be retarded by either 263 or 262 lines, respectively, to complete the necessary full 1H correction. If before the chosen delay is reached, additional ΔP's are detected, correction is implemented in full in the next vertical blanking interval, with the final ½H correction accomplished when no further errors are detected within the delay time, and the delay in store 16 is restored to approximately one frame.

The description thus far has assumed the use of only one vertical motion detector which compares either successive odd fields or successive even fields, but not both, to detect vertical motion, and the point has been made that the interlaced scan of commercial television systems precludes comparison between immediate successive fields. It is recognized, however, that certain industrial and military television standards which do not employ interlace would be amenable to successive field comparisons. Provision of a second detector for sensing vertical shifts in the fields not compared by the first detector which, in the description thus far has been considered an odd field detector, would significantly improve the operation of the system. More particularly, the use of a second, even field detector 26 enables more precise corrections to be performed upon slowly changing vertical motion by detecting motion that might occur during the half-frame interval between successive odd fields. This doesn't means that the odd field hasn't also moved; it merely means that it has not moved sufficiently for the detector to measure a 1H change in position. The sliced video from slicer 30 is applied to even field detector 26, and if the transition detector 62 is incorporated in the slicer it could serve both the odd and even field detectors, and logic circuit 70 and switch actuator 60 likewise could be shared by the two detectors. However, the even field detector must have its own latch and comparator in order separately to detect and measure motion of the horizontal reference edge by repetitive comparison of the current even field with the even field immediately preceding it. Reverting to the discussion of frame line correction for slowly changing motion, whichever of the two field detectors first indicates the need for correction initiates the change by advancing the read address of store 16 by 262 or 263 lines; however, rather than implementing the additional frame line of delay after a predetermined delay of say, seven frames, it is implemented when the other field detector senses the additional motion, thus providing more precise correction. If both detectors should indicate a 1H shift of the horizontal reference edge, the correction would be implemented as a full 1H change in store 16. It should be kept in mind that detected motion of 1H in both the odd and even fields represents a movement of only one line per frame and is corrected by changing the read address by 1H, not 1H for each detector, which would give two lines per frame.

Keeping in mind that correction for horizontal camera motion will be applied concurrently with application of vertical correction, but still deferring description of how the amount of horizontal correction is measured and applied, it will be evident that as television lines are added or subtracted to effect vertical stabilization, and small increments are added or subtracted to effect horizontal stabilization, the resulting encroachment of the blanking region into the reproduced picture will become visible, which places a practical limit on the range of correction that can be achieved. In order that blanking not be seen in the reproduced picture, means are provided for "cropping" that portion of the blanking region seen in the picture; this can be accomplished by expanding the active picture, subsequent to application of the correction, by means now well-known in the industry as "electronic zoom", to an arbitrary extent, both horizontally and vertically, such that the home viewer will not see the blanking which the correction has introduced into the larger picture. This requirement for "cropping" imposes an upper limit on the extent to which correction can be applied, because the more the correction the more the picture must be cropped, and at some point the picture becomes unacceptable. As a practical matter it has been found that no more than sixteen television lines should be cropped from the height of the picture and, by analogy, no more than a comparable amount from the width of the picture. This means that it is possible to apply ±8 television lines of correction in order to achieve vertical stabilization and yet have an acceptable picture.

The just described correction range, that is, ±8 television lines for vertical stabilization, is not to be confused with the height of the tracking window (also measured by numbers of H) employed to determine the size of the active region selected for following the reference edge for detection and measurement of vertical motion. In a typical situation, the tracking window "looks" at fewer horizontal lines than the system is capable of correcting for; if the vertical tracking window is too high, then other information present within the scene could intrude into the tracking window and frustrate the operation of the system. In the example illustrated in FIG. 3, if the tracking window were appreciably higher than the assumed three horizontal lines, the lower horizontal edge 48 of the picture frame might intrude into the tracking window and confuse the system as to which edge it has selected for vertical picture stabilization. As has been noted, the transition detector has intelligence to the extent that it can distinguish between a low-to-high and and high-to-low transition in the sliced video, and switch 72 gives the operator the option of selecting either or both, and seizes upon the first horizontal reference edge it finds. However, as has been noted, joy stick 54 enables the operator to shift the position of the cursor to enable selection of a particular horizontal reference edge. As will be described presently, if the height of the tracking window is limited to a reasonable number of lines it locks onto and follows the selected edge in spite of vertical motion of that edge.

Before proceeding to a detailed description of position predictor 56, it will be useful to review the functions of the cursor and the tracking window, and how the position predictor affects the tracking window; although the horizontal stabilizer (to be described) also employs a cursor, a tracking window and a predictor, because its operation is so closely analogous the present description will be limited to the vertical stabilizer. During startup of vertical stabilization, that is, at any time when a reference edge is being selected by the operator, the position detector is disabled and the system "looks" for a reference at the region defined by the boundaries of the cursor, which begins at its left vertical edge. When transition detector 62 has detected a reference edge, switch 58 is moved to the "RUN" position and the stabilizer thereafter "looks" for the selected reference edge within the region defined by tracking window generator 55. This region, which is termed a "tracking window" because it moves with or vertically tracks the motion of the reference edge and is a "window" through which the stabilizer looks for the reference edge, is defined by the position of the left edge of the cursor stored in an H position latch 57 when it entered the "RUN" mode, and the vertical position along this edge is established by the predictor, which provides a range along this vertical edge over which the reference edge is looked for. Thus, the vertical stabilizer looks for a horizontally oriented reference along a vertical line segment. The principal function of the predictor is automatically to position the tracking window such that the line segment is centered over the expected or predicted position of the reference edge, such centering occurring along the cursor-established left edge of the tracking window. The predictor decides where to center the tracking window by adding the previous position of the reference to its previous change in position: i.e., by looking at where the reference edge was last seen and how much and in which direction it was moving, the predictor determines where it can be expected to be "seen" in the next frame. To provide some margin for error in the event of a change in the velocity of movement of the reference edge from what it was at last look, the line segments must have sufficient length to accommodate such velocity changes; however, they should not be longer than necessary for this purpose since the longer they are the greater is the chance that some other horizontal edge in the picture might intrude into the tracking window and be confused with the reference edge. The optimum tradeoff depends largely on the program material being stabilized, which is the reason the switch 74 is provided to permit the operator to select the length, either three, seven or fifteen horizontal lines in the present embodiment. If the unsteadiness of the scene is relatively minor, short tracking windows (e.g., 3H high) may be used if necessary to prevent interference from other edges in the picture.

If the stabilizer fails to find an edge within its tracking window then the stabilizer returns to the startup mode, with switch 58 in the "START" position. On the other hand, when the tracking window has found and locked onto the reference edge, the operation thereafter is automatic.

Figure 2:
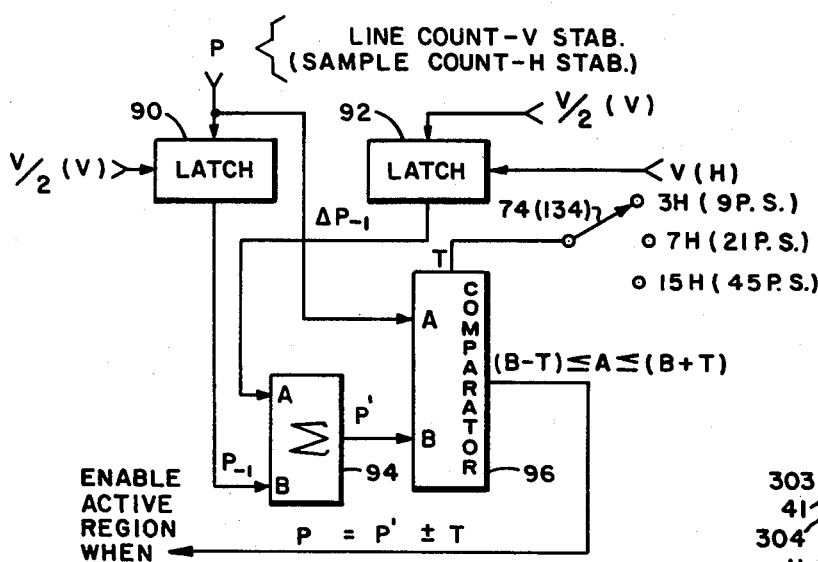
FIG. 2 is a block diagram of a position predictor adaptable for use in either the vertical or horizontal stabilizer.
Figure 6:
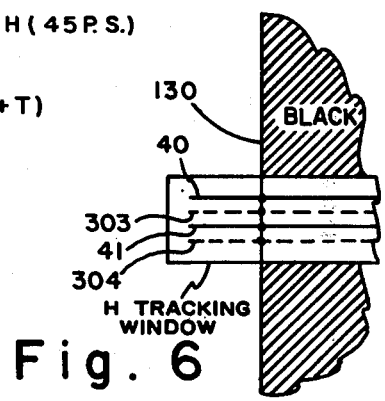
FIG. 6 is an illustration of a fragment of a display on a television monitor useful in describing the operation of the system of FIG. 5.

A preferred form of position predictor 56 shown in FIG. 2 has three inputs: (1) a signal indicative of the height of the active region of the tracking window, namely, 3H, 7H or 15H; (2) a signal $\Delta P$ from the output of comparator 84 indicative of the change in position of the selected reference edge between the two previous successive odd (or even) fields; and (3) a signal P from the output of position counter 80. The predictor uses this information to adjust the position of the tracking window, this being the only portion of the picture in which the transition detector is enabled. The predictor being of this same general configuration in both the vertical and horizontal stabilizers, it is illustrated only once, with the modifications required for utilization in the horizontal stabilizer shown in parentheses; for example, for the horizontal stabilizer application the tracking window range selector is calibrated in terms of picture elements instead of television lines (i.e., 9P.S., 21P.S. or 45P.S). The predictor includes a pair of latch circuits 90 and 92 which are connected to respectively store from position counter 80 a digital number P representative of the position (i.e., the line number) in which the horizontal reference edge occurred in the next previous corresponding field, and the change in position, $\Delta P$, of the reference edge from what it was in the corresponding field before the next previous corresponding field to what it is in the next previous corresponding field. These inputs to latch circuits 90 and 92 are each clocked out at frame rate in response to application of frame pulses derived from sync stripper 12 (for example) and respectively applied to the input terminals B and A of a summing circuit 94; that is, the number $P_{-1}$ is added to $\Delta P_{-1}$, which may be thought of as $P_{-1} - P_{-2}$, where $P_{-2}$ is the position of the reference edge in the corresponding field before the next previous corresponding field. The sum of $P_{-1} + \Delta P_{-1} = P'$, where P' is the predicted position of the reference edge in the next-to-occur corresponding field. The sum signal P' is applied to the input terminal B of a comparator 96 in which it is compared with the output of position counter 80, which is directly applied to the A input terminal of the comparator. Depending on the position of switch 74, which is selected by the operator, a signal T representing a "tolerance" of 3H, 7H or 15H height, is applied as a third input to comparator 96. The output of the comparator is high when the predicted position P' is equal to the present position, P, plus or minus T, and after initial startup is applied to the tracking window generator 55. The system thus looks for the edge within the small area of the tracking window (discussed above) centered at a vertical position determined by the position predictor. That is, restating the described operation of the position predictor, if P'=predicted present position of reference edge $P_{-1}$=position of edge in next previous corresponding field $P_{-2}$=position of edge in corresponding field before next previous corresponding field $$\Delta P_{-1} = P_{-1} - P_{-2}$$

then the system centers the active region of the tracking window at $$P' = P_{-1} + \Delta P_{-1} = 2P_{-1} - P_{-2} \text{ (or}$$
$$P' = P_{-2} + 2\Delta P_{-1})$$

Operation of the predictor is based on the assumption that the camera motion, and thus the motion of the reference horizontal edge, is in the same direction over a period of several frames and that the magnitude or extent of motion changes gradually. Reversals in the direction of up and down motion, or changes in the degree of such motion are accommodated by the height of the tracking window, and as will be seen presently, changes in direction of side-to-side camera motion, and changes in the degree of such motion are accommodated by the size of a similar tracking window embodied in the horizontal stabilizer. An important feature of the system is that after startup the tracking window continues to follow (i.e., locks onto) a selected reference edge even if the joy stick controlled cursor is moved away from the edge, whether by manipulation of the joy stick or significant camera motion.

Turning now to the horizontal stabilization aspect of the system, although the foregoing description of the vertical stabilizer implies that the horizontal stabilizer is similar in implementation and operation, there are major differences, the most significant of which stems from the fact that the vertical stabilizer operates responsively to integral line differences; that is, shifting of the picture is done on the basis of an integral number of horizontal lines, and occasionally in terms of so-called half-lines when the rate of vertical motion is rather slow. Using composite coding of the video, the color subcarrier contained in the video does not pose significant problems in the vertical stabilizer in that shifting of the picture by an integral number of lines causes the color subcarrier to be in a known one of two phases, either the so-called 0° phase or the 180° phase, and a chrominance inverter conventionally built into frame store 16 provides the necessary correction to ensure that the color subcarrier always has the correct phase as it leaves the frame store. In the horizontal stabilizer, however, in which the delay device introduces delays of only a few microseconds duration, the amount of which is varied in terms of system clock periods, the presence of the color subcarrier creates troublesome problems. In practice (and this will be described in greater detail presently) the delay unit is set to establish a nominal delay for the video passing through it and the amount of delay, determined by the control circuit illustrated in FIG. 5 and to be described presently, is adjusted relative to the intermediate delay, in terms of clock units, which in the case of sampling at four times the color subcarrier frequency, is approximately 70 nanoseconds each, to compensate for the measured horizontal shift of the picture caused by camera unsteadiness. The exact nature of the problem and how it is solved will become evident as the description proceeds.

In a successfully operated embodiment of the system, the output from the vertical stabilizer (FIG. 1), that is, the analog composite video signal from PROC AMP 20, is digitally encoded in an analog to digital converter 102 and applied to the input of a horizontal delay device 104; thus, the horizontal stabilizer applies horizontal correction to a video signal that has already been vertically stabilized. Although application or horizontal stabilization in this way is not essential to the operation of this system, it has been found to be operationally acceptable and, in general, more easily implemented than other approaches that might be used. However, as in the vertical stabilizer, a signal for controlling the delay of delay device 104 is derived from the input video signal because horizontal stabilization depends on a vertically disposed edge in the scene, the horizontal position of which will change with side-to-side motion of the picture and thus provide a reference for determining the amount of correction needed to maintain the vertically disposed edge, and hence the total picture, at substantially the same horizontal position.

The reference signal for horizontal stabilization may be and preferably is derived from the sliced video from slicer 30 (FIG. 1), which is applied to a transition selector 106 which, as in the vertical stabilizer, consists of a pair of "D"-type flip-flops 108 and 110 connected as shown with the Q output of the former applied to the D input of the latter, and the sliced video applied to the D input of flip-flop 108. The flip-flops are both reset at the beginning of each field by vertical sync pulses applied to their respective "CLEAR" inputs. Here the similarity with the vertical transition detector ends; the clock inputs to the flip-flops, instead of being a sequence of pulses separated by 1H and spanning several lines, is a sequence of pulses separated by a period of time equal to one cycle of the 14 MHz system clock, all of which span a portion of only one horizontal television line. This pulse sequence is generated by a 3-input AND gate 112, the output of which goes high only when all three inputs go high. Depending on the position of a switch shown schematically at 114, one of the inputs is either a horizontal cursor from a horizontal cursor generator 116 having a joy stick 118 for manipulating the position of the cursor on the display, or a horizontal tracking window from a tracking window generator 119; both comprise a sequence of pulses separated by 1H and in which the number of pulses is equal to the height of the cursor or the height of the tracking window, as the case may be. A second input to the AND gate is a "line select" input, which is high for a period of 1H, for selecting just one of the pulses from the cursor or tracking window sequence; i.e., for selecting just one television line on which detector 106 is to be enabled. The "line select" input is produced by a line select generator 150, (the operation of which will be described later) and selects the television line on which the detector will be active, while the horizontal cursor or horizontal tracking window (whichever is present) selects at what point along this selected TV line the detector will be active. At this portion of the line where both of the described inputs are high the output of AND gate 112 will be high whenever the third input, the 14 MHz system clock, is high, and will be low when the system clock is low. The period of one sample of this clock being equal to the sampling period of A/D converter 102, is also equal in time to the smallest incremental change in horizontal delay the delay device 104 is able to provide toward effecting horizontal stabilization.

It was seen from the description of the vertical stabilizer that the flip-flops could in that case store the output of slicer 30 at two different points in time separated by the period of clock inputs to the flip-flops. Flip-flops 108 and 110 perform a similar function in the horizontal stabilizer, and since the clocks are one cycle of the 14 MHz clock apart, detector 106 detects transitions between adjacent picture samples in the sliced video, rather than between the same points on adjacent picture lines as was the case in the vertical stabilizer. Thus, the Q output of flip-flop 110, labelled A, is the slicer output at time=T, and the output B of flip-flop 108 is the slicer output at time=T+1 clock cycle. This permits a comparison to be made between A and B to ascertain whether a horizontal transition has occurred; using a logic circuit 122 having the truth table shown in FIG. 1, and ignoring the effect of operation of a selector switch 124, a "true" output is produced only when A is low and B is high, or when A is high and B is low. Switch 124 permits the operator to select between the L-H and H-L transitions, or to use both, the choice being determined by the nature of the vertical reference edge available in the scene. In the example shown in FIG. 3, the left hand edge 130 of the dark door 42 against the bright wall 44 would provide a good reference for measurement of side-to-side motion of the picture in which it is contained. This edge is an example of high-to-low transition (i.e., from white to black) and the opposite edge of the door is an example of a low-to-high transition.

During start up, with switch 114 in its "START" position, the vertically disposed edge in the scene chosen to be the reference is electronically selected by positioning the cursor over the chosen edge. Under control of display generator 36 the cursor appears on monitor 38 as a horizontally disposed narrow rectangle 132 having greater illumination intensity, or preferably a different color, than that of the black and white sliced video, and as in the case of the vertical stabilizer can be moved to any desired position on the display by manipulation of joy stick 118. In the illustrated example the cursor has been positioned to straddle the vertical edge 130 so as to "look at" the points of intersection of the vertical edge with selected horizontal lines in the raster so as to specify such points on edge 130 as the picture contained reference for measurement of side-to-side motion.

When detector 106 has detected the transition selected by the operator-positioned cursor, logic 122 produces a "true" output which is applied to a circuit 140 which throws switch 114 from its "START" to its "RUN" position, thereby to cause the pulse sequence representing the horizontal tracking window to be applied to AND gate 112. This output signal is also applied to display generator 36 which causes the window to appear on monitor 38 as a horizontally disposed rectangle, and to the "STOP" input of a position counter 142, the function of which is to continuously determine, at field rate, the horizontal position of the selected reference edge. The counter is started at the beginning of each television line in response to horizontal sync pulses derived, for example, from sync stripper 12 (FIG. 1) and applied to the "RESET" terminal, and is clocked by the system clock which, as has been noted, typically is a train of pulses spaced by about 70 nanoseconds. The counter continues to count until the vertical reference edge is encountered, whereupon a "true" signal from logic 122 applied to the "STOP" terminal stops the counter. When the counter is stopped it produces at its output terminal a number representative of the current position of the vertical reference line; i.e., the number of system clock intervals from the left-hand end of the selected horizontal line. This number is compared in a comparator 144 with the number stored in a latch 146 representing the position of the vertical edge one field earlier and produces an output, designated ΔP, which represents the amount and direction of shift, if any, in the horizontal position of the vertical reference line that has taken place since the preceding field. This signal is applied to an H-delay interface 147 and adjusts the delay of delay device 104 relative to the aforementioned nominal delay to compensate for the measured horizontal shift of the reference edge. As in the case of vertical stabilization, there is a practical limit to the number of picture samples by which the picture can be shifted, either right or left, without running into unacceptable "cropping" of the displayed picture. Recalling that ±8 television lines, or ±16 frame lines (which represents 6.6% of total active picture height) is a practical limit for vertical stabilization, if horizontal stabilization is correspondingly limited to 6.6% of the active picture width the correction range is approximately 35 26 system clock intervals or approximately 3.6 microseconds. The vertically and horizontally stabilized signal produced at the output of delay device 104, which may be cropped by as much as about 6.6% of the active picture height and width, is converted to analog form by a digital to analog converter 105 and then, if desired, is applied to a picture expander 107, such as the known "electronic zoom" system, for expanding the video signal so as to produce a picture of normal full height and width.

The function of position predictor 120 is analogous to that of the position predictor in the vertical stabilizer, namely, to automatically position the horizontal tracking window such that its active region is centered over the expected or predicted position of the vertical reference edge, such centering occurring orthogonally to the cursor-controlled axis, stored in a V position Latch 121, of the tracking window. The predictor decides where to center the tracking window by adding the previous position of the reference to its previous change in position; i.e., by looking at where the reference edge was last seen and how much and in which direction it was moving, the predictor determines where it can be expected to be "seen" in the next field. To provide a margin for error in the event of a change in velocity of movement of the reference edge from what it was at last look, the active region must have sufficient length to accommodate to such velocity changes; however, it should not be longer than necessary for this purpose since the longer it is the greater the chance that some other vertical edge in the picture might intrude into the horizontal tracking window and be confused with the selected reference edge. Thus, provision is made for the operator to select, by operation of switch 134, a tracking range of either nine, twenty-one, or forty-five picture samples. The predictor may be of the form shown in FIG. 2 in which (as has been noted earlier) the parameters for horizontal stabilization are enclosed in parentheses. As used for horizontal stabilization, the three inputs to the predictor are: (1) a signal indicative of the width of the active region of the tracking window, namely, nine, twenty-one or forty-five picture samples; (2) a signal ΔP from the output of comparator 144 indicative of the change in position of the selected vertical edge between the two previous successive fields; and (3) a signal from the output of position counter 142. The predictor "looks at" the detected motion between these two previous successive fields and utilizes this information to adjust the position of the center of the horizontal tracking window, this being the only portion of the picture in which transition detector 106 is enabled. Latch circuit 90 receives from position counter 142 a digital number representative of the picture sample position in which the vertical reference edge occurred in the next previous field, and latch 92 receives a signal ΔP indicative of the change in position of the reference edge from what it was in the field before the next previous field to what it is in the next previous field. These inputs are each clocked out at field rate in response to application of horizontal sync pulses derived from sync stripper 12 (for example) and are respectively applied to the input terminals B and A of summing circuit 94; thus, the number P−1, the picture sample position of the reference edge in the next previous field is added to ΔP, which may be thought of as P−1−P−2, where P−2 is the position of the reference edge in the field before the next previous field. The sum of P−1+ΔP=P′ is the predicted position of the reference edge in the next-to-occur field. The sum signal P′ is applied to the input terminal B of comparator 96 where it is compared with the directly applied output from position counter 142. The output of the comparator is high when the predicted position P′ is equal to the present position plus or minus T, and after initial startup is applied to tracking window generator 119 and establishes the active region of transition detector 106. As in the case of the vertical stabilizer, operation of position predictor 120 assumes that camera motion, and thus the motion of the reference vertical edge, is in the same direction over a period of several frames and that changes in motion are gradual. Reversals in the direction of side-to-side motion, or changes in velocity of such motion, are accommodated by the width of the horizontal tracking window.

The organization and function of the horizontal stabilizer having been described, attention is now directed to precautions that must be taken to ensure proper operation in an NTSC environment. Recalling that the output from PROC AMP 20 of the vertical stabilizer (FIG. 1) is a composite NTSC signal, the presence of the chrominance subcarrier may introduce problems in the measurement and application of compensating delays in the horizontal delay device. Among several techniques for implementing delays in the NTSC signal without affecting the phase of the color subcarrier relative to the reference burst is to separate the encoded signal into its luminance and chrominance components, subject the components to the required delay, demodulate the chrominance signal, re-modulate with a color subcarrier of the correct phase, and then recombine the re-modulated chrominance with the luminance component, all as taught in commonly assigned U.S. Pat. No. 4,291,839 to Rossi. The result would be a horizontally corrected video signal in which the color subcarrier is in correct phase relationship with the the color burst signal.

Figure 7:
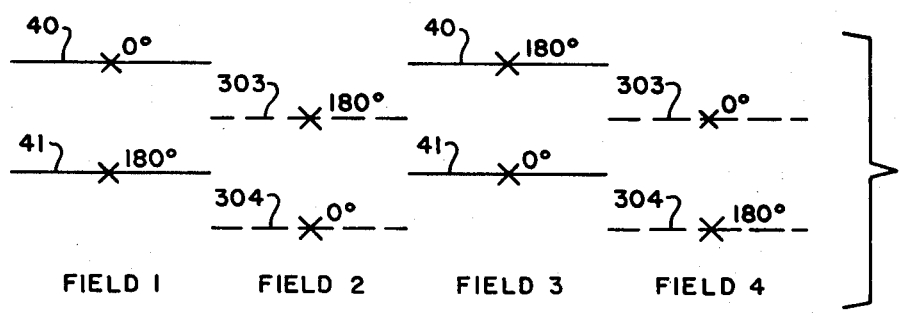
FIG. 7 is a diagram showing lines from selected fields, also useful to an understanding of the operation of the system of FIG. 5.

The color subcarrier of the NTSC system may also create errors in the measurement process for determining the necessary delay compensation of the horizontal stabilizer. The problem results because of the four field cycle of the subcarrier, and even though an effect is made to base measurements (for both vertical and horizontal stabilization) on the luminance component only, a sufficient amount of subcarrier is present in the output of slicer 30, particularly upon occurrence of saturation level chrominance, to create such errors. The problem and the technique necessary to avoid it can be understood by observing vertically disposed white-black transitions within the tracking window used as the reference edge for measuring horizontal motion. To demonstrate the subcarrier phase relationship, FIG. 7 illustrates the lines within the tracking window as they occur in four successive fields. On line 40 of field 1 subcarrier phase will be assumed to be 0° at the point of the transition at the output of slicer 30. In field 2 the closest frame line to line 40 within the tracking window is line 303, 263 lines after line 40. Here the subcarrier has a 180° phase difference from line 40 along the same vertical position. If this line is used to sample the horizontal position, the reversal of phase may cause the slicing point to change slightly to the left or right, causing an incorrect error to be generated. To sample a line containing the same phase, it is necessary to go to line 304, 264 lines after line 40. In field 3, it can be seen that it is necessary to sample line 41, not line 40, which is 262 lines after line 304. In field 4 line 303, 262 lines after line 41, is used which completes the four field cycle and line 40 is again sampled in the next field. It becomes evident that the subcarrier phase is identical an even number of lines later and 180° different an odd number of lines later. Thus a line selector circuit 150 utilizing a flip-flop 152 which is clocked by H, will have an output which is high for every even numbered line and low for every odd numbered line. This is used to chose the line within the tracking window which satisfies the correct phase relationship.

As background for the discussion to follow, it is important to remember that the delay device 16 of the vertical stabilizer is altered back and forth between a field delay mode and a frame delay mode in order to achieve frame line correction. It is also important to keep in mind that any correction must be applied to the field in which the displacement of the reference edge is detected. Since the detector of the horizontal stabilizer (FIG. 5) is fed the same signal as the input to the vertical stabilizer, while the input signal to horizontal stabilizer is the output from the vertical stabilizer, the delay between detection and correction of horizontal motion varies. The detector of the horizontal stabilizer requires the period of one field to produce an error signal; therefore, when the delay device 16 of the vertical stabilizer is in the field delay mode a given field will reach the delay device of the horizontal stabilizer at the same point in time that the error signal for that particular field becomes available. Therefore, the correction can be applied during the immediately following vertical blanking innterval and the entire field will receive the proper horizontal correction. However, if the delay device 16 of the vertical stabilizer is in the frame delay mode, then a given field will reach the delay unit 104 of the horizontal stabilizer one field later than the time when the error signal for that particular field is available; consequently, the error signal must also be delayed by an additional field. This is accomplished by latching the error signal in the H-delay interface 147 for the duration of one field before applying it during vertical blanking to delay unit 104. Whether or not the delay is inserted is controlled by a signal from store interface 22 of the vertical stabilizer indicative of which delay mode the vertical stabilizer is in.

It will have been seen from the foregoing that the signal processing system of the invention satisfies the objective of detecting and measuring picture unsteadiness in recorded or live video and the displayed picture. The system separately measures up and down and side-to-side motion, and although in the preferred embodiment the horizontal correction is applied to an already vertically stabilized signal to produce a corrected signal stabilized in both directions, this is not essential and it is within the contemplation of the invention to separately horizontally stabilize the input video signal. Also, it will be appreciated that in case complete stabilization is not essential or desired, the vertical and horizontal stabilization portions of the system can each be utilized independently of the other.

The described system may also be used to generate signals for achieving certain special effects, as by using one video source for generating a correction signal and applying the correction to a video signal from another source. For example, a first video signal representing a boat bouncing up and down on a rough sea might be used to generate the correction signal necessary to stabilize the position of the boat; however, instead of using the correction signal to stabilize the first source, the correction signal may be applied to a second, different video signal representing, for example, a static boat in a studio scene which by using suitable known chroma keying techniques might be inserted into a desired background signal. The correction signal applied to the static scene video would cause that video to move as dictated by the correction signal, thereby creating the illusion that the boat is moving up and down in the studio scene just as the one in the live scene had. This can be done either by simultaneously generating the first and second video signals and transferring the correction signal to the static scene, or generating and recording the correction signal, on a floppy disk for example, and later playing it back and applying it to the second video signal.

Although the description of the stabilizer implied immediate application of the correction signal, it is possible (as has just been suggested) and in some situations preferred to store the correction signal in its digital form for later application or possible revision before actually using it. For example, assuming that a three or four minute segment of video requires stabilization, but that on the first pass the operator was able to get most of it stabilized except for a few places where the stabilization could be improved, having the "first pass" correction signal stored enables the operator to go back and improve those places, perhaps by using a different reference edge in just that portion of the segment requiring improvement. That is, the correction signal applicable to only a small portion of the total segment can be altered without having to do the whole segment over again. Stated another way, by recording the correction signal, off-line as it were, the operator can develop a good correction signal for the whole segment by doing it in pieces, picking out whichever reference edge at the time happened to be best for that portion of the scene.

It will now be apparent to those skilled in the art that various modifications and adaptations can be made to the described embodiment of the invention without departing from the spirit and scope of the invention as a whole. For example, techniques other than those described for measuring image motion against a stable reference, including edge trackers, gate trackers and correlation trackers, can with suitable modification be utilized, and the several parts of each of the vertical and horizontal stabilizers can be implemented differently than described while performing comparable functions. Accordingly, it is intended that the invention be limited only by the following claims.

We claim:

1. System for processing and producing from an input video signal exhibiting unsteadiness due to having been produced by an unsteady television camera, a corrected video signal essentially free of such unsteadiness, said system comprising, in combination:

means receiving said input video signal and for selecting therefrom a reference object within the camera field of view, which reference object but for said camera unsteadiness would normally be stationary, against which to measure picture motion;

means for measuring motion of said selected reference object and for producing a correction signal representative of such measured motion; and means operative responsively to said correction signal for making the necessary corrections to the overall television picture represented by said input video signal to eliminate picture unsteadiness.

2. System according to claim 1, wherein said reference object selecting means comprises means for separately selecting from said input video signal at least one of a horizontally disposed reference edge and a vertically disposed reference edge within the camera field of view against which to measure up and down and side-to-side motion, respectively;

wherein said measuring means comprises means for separately measuring motion of the selected one or ones of said horizontally and vertically disposed reference edges for producing vertical and horizontal correction signals, respectively; and wherein said correction-making means is operative responsively to a selected one or ones of said correction signals.

3. System according to claim 2, wherein said correction-making means includes separate means for making vertical corrections to the television picture to eliminate up and down motion, which means comprises:

first delay means having a controllable delay time connected to receive said input video signal and operative responsively to said vertical correction signal to vary its delay time in integral line increments in a direction and by an amount necessary to substantially eliminate up and down motion of said horizontally disposed reference edge.

4. System according to claim 3, wherein said input video signal is a field-interlaced signal, and wherein said first delay means is a digital store having a controllable delay time of at least one television field.

5. System according to claim 4, wherein said means for measuring the motion of said horizontally disposed reference edge comprises means for comparing the vertical position of said horizontally disposed reference edge in successive corresponding fields and producing for each such comparison a vertical correction signal indicative of the number of television lines of position change, if any; and wherein said digital store is operative responsively to said vertical correction signal to vary its delay in a direction and by an amount equal to the integral number of television lines sufficient to produce at the output of said store a vertically stabilized video signal in which said horizontally disposed reference edge is maintained at substantially the same vertical position.

6. System according to claim 2, wherein said means for selecting a reference edge comprises:

means for slicing said input video signal for producing signals representing a transition in contrast caused by an edge occurring within the camera field of view;

means including a television monitor for visually displaying said sliced video signal;

means for producing an electronic cursor positionable on said monitor by an operator to intersect an edge of interest in the displayed sliced video; and means operative responsively to the intersection of said cursor with a selected edge for producing transition-indicating signals for use in measuring motion of the selected edge.

7. System according to claim 6, wherein said input video signal is a color television signal containing luminance and chrominance components, and wherein said slicing means includes means for substantially removing the chrominance component of said input video signal prior to slicing.

8. System according to claim 6, wherein said cursor-producing means includes means for producing a first vertically disposed cursor for selecting a horizontally disposed reference edge of interest, and means for producing a second horizontally disposed cursor for selecting a vertically disposed reference edge of interest.

9. System according to claim 8, wherein said means for measuring motion of a selected horizontally disposed reference edge comprises:

first counting means connected to be clocked at the line rate of said input video signal, to be successively reset at the field rate of said input video signal, and to be stopped by a transition-indicating signal for producing an output vertical position-indicating count indicative of the position of the line containing said selected reference edge, and means for comparing each such vertical position-indicating count with the vertical position-indicating count produced in the next previous corresponding field and for each such comparison producing a vertical correction signal.

10. System according to claim 9, wherein said means for measuring motion of a selected horizontally disposed reference edge further comprises:

means operative responsively to the output count of said first counting means and to said vertical correction signal for producing a first tracking window which automatically locks onto and tracks the selected horizontally disposed reference edge and for predicting its position in the next succeeding corresponding field.

11. System according to claim 10, wherein said last-mentioned means further includes means for selectively changing the vertical height of said first tracking window.

12. System according to claim 9, wherein said means for measuring motion of a selected vertically disposed reference edge comprises:

second counting means connected to be clocked at a rate corresponding to the reciprocal of the picture element interval of said input video signal, to be successively reset at the line rate of said input video signal, and to be stopped by a transition-indicating signal for producing an output horizontal position-indicating count indicative of the position of the selected vertically disposed reference edge along a line selected by said horizontally disposed cursor, and means for comparing each such horizontal position-indicating count with the horizontal position-indicating count produced in the next previous field and for each such comparison producing a horizontal correction signal.

13. System according to claim 12, wherein said means for measuring motion of a selected vertically disposed reference edge further comprises:

means operative responsively to the output count of said second counting means and to said horizontal correction signal for producing a second tracking window which automatically locks onto and tracks the selected vertically disposed reference edge and for predicting its position in the next succeeding field.

14. System according to claim 13, wherein said last-mentioned means includes means for selectively changing the horizontal length of said second tracking window.

15. System according to claim 13, wherein said input video signal is an NTSC television signal in which the phase of the color subcarrier has a four field sequence, and wherein said means for measuring motion of a selected vertically disposed reference edge includes means for recycling the line selected by the horizontally disposed cursor in a four-field sequence for causing the color subcarrier at the vertically disposed reference edge to have the same phase in successive fields.

16. System according to claim 8, wherein said means for measuring motion of a selected vertically disposed reference edge comprises:
second counting means connected to be clocked at a rate corresponding to the reciprocal of the picture element interval of said input video signal, to be successively reset at the line rate of said input video signal, and to be stopped by a transition-indicating signal for producing an output horizontal position-indicating count indicative of the position of the selected vertically disposed reference edge along a line selected by said horizontally disposed cursor, and
means for comparing each such horizontal position-indicating count with the horizontal position-indicating count produced in the next previous field and for each such comparison producing a horizontal correction signal.

17. System according to claim 16, wherein said means for measuring motion of a selected vertically disposed reference edge further comprises:
means operative responsively to the output count of said second counting means and to said horizontal correction signal for producing a second tracking window which automatically locks onto and tracks the selected vertically disposed reference edge and for predicting its position in the next succeeding field.

18. System according to claim 17, wherein said last-mentioned means includes means for selectively changing the horizontal length of said second tracking window.

19. System according to claim 17, wherein said input video signal is an NTSC television signal in which the phase of the color subcarrier has a four field sequence, and
wherein said means for measuring motion of a selected vertically disposed reference edge includes means for recycling the line selected by the horizontally disposed cursor in a four-field sequence for causing the color subcarrier at the vertically disposed reference edge to have the same phase in successive fields.

20. System according to claim 3, wherein said correction-making means includes means for separately making horizontal corrections to the television picture to eliminate side-to-side motion, which means comprises:
second delay means having a controllable delay time and operative responsively to said horizontal correction signal to vary the delay thereof in system clock period increments in a direction and by an amount necessary to substantially eliminate side-to-side motion of said vertically disposed reference edge.

21. System according to claim 20, wherein the means for measuring motion of said vertically disposed reference edge comprises means for comparing the horizontal position of said vertically disposed reference edge in successive fields and for each comparison producing a horizontal correction signal indicative of the number of system clock intervals change of position, if any.

22. System according to claim 20, wherein said second delay means receives a vertically stabilized video signal from said first delay means for producing at its output a vertically and horizontally stabilized video signal.

23. System according to claim 4, wherein said correction-making means includes means for separately making horizontal corrections to the television picture to eliminate side-to-side motion, which means comprises:
second delay means having a controllable delay time and operative responsively to said horizontal correction signal to vary the delay thereof in system clock period increments in a direction and by an amount necessary to substantially eliminate side-to-side motion of said vertically disposed reference edge.

24. System according to claim 23, wherein the means for measuring motion of said vertically disposed reference edge comprises means for comparing the horizontal position of said vertically disposed reference edge in successive fields and for each comparison producing a horizontal correction signal indicative of the number of system clock intervals change of position, if any.

25. System according to claim 23, wherein said second delay means receives the vertically stabilized video signal from said first delay means for producing at its output a vertically and horizontally stabilized video signal.

26. System according to claim 5, wherein said correction-making means includes means for separately making horizontal corrections to the television picture to eliminate side-to-side motion, which means comprises:
second delay means having a controllable delay time and operative responsively to said horizontal correction signal to vary the delay thereof in system clock period increments in a direction and by an amount necessary to substantially eliminate side-to-side motion of said vertically disposed reference edge.

27. System according to claim 26, wherein the means for measuring motion of said vertically disposed reference edge comprises means for comparing the horizontal position of said vertically disposed reference edge in successive fields and for each comparison producing a horizontal correction signal indicative of the number of system clock intervals change of position, if any.

28. System according to claim 26, wherein said second delay means receives the vertically stabilized video signal from said first delay means for producing at its output a vertically and horizontally stabilized video signal.

* * * * *